US012811850B2

(12) United States Patent
Wei et al.

(10) Patent No.: US 12,811,850 B2

(45) **Date of Patent: *Nov. 24, 2026**

(54) SYSTEMS AND METHODS FOR OPERATING A MEDIA TRANSMISSION NETWORK

(71) Applicant: Evertz Microsystems Ltd., Burlington (CA)

(72) Inventors: Jeff Wei, Richmond Hill (CA); Rakesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 50 days.

This patent is subject to a terminal disclaimer.

(21) Appl. No.: 18/937,725

(22) Filed: Nov. 5, 2024

(65) Prior Publication Data

US 2025/0132976 A1 Apr. 24, 2025

Related U.S. Application Data

(63) Continuation of application No. 18/339,393, filed on Jun. 22, 2023, now Pat. No. 12,143,431, which is a (Continued)

(51) Int. Cl.

*H04L 41/0806* (2022.01)
*H04L 1/00* (2006.01)

(Continued)

(52) U.S. Cl.

CPC ........ *H04L 41/0806* (2013.01); *H04L 1/0035* (2013.01); *H04L 1/0073* (2013.01);

(Continued)

(58) Field of Classification Search

CPC . H04L 1/0035; H04L 1/0073; H04L 41/0806; H04L 47/26; H04L 65/75; H04L 69/22; H04N 21/2343; H04N 21/2365

See application file for complete search history.

(56) References Cited

U.S. PATENT DOCUMENTS 5,602,992 A 2/1997 Danneels
6,363,429 B1 3/2002 Ketcham (Continued)

FOREIGN PATENT DOCUMENTS

CN 103561212 A 2/2014
GB 2492749 A 1/2013

*Primary Examiner* — G. C. Neurauter, Jr.

(74) *Attorney, Agent, or Firm* — SMART & BIGGAR LP

(57) ABSTRACT

Systems and methods are provided for operating a media transmission network. The system includes at least one destination device for receiving a plurality of media streams from a plurality of source devices. The system further includes a controller that is configured to, for each media stream of the plurality of media streams: determine a media property adjustment for the media stream based at least on the media stream; identify a source device from the plurality of source devices associated with generating the media stream; determine at least one device setting for the identified source device to apply the media property adjustment to the media stream; generate a control packet for configuring the identified source device based on the at least one device setting, the control packet including the at least one device setting; and transmit the control packet to the identified source device.

20 Claims, 4 Drawing Sheets

Related U.S. Application Data continuation of application No. 17/355,228, filed on Jun. 23, 2021, now Pat. No. 11,722,541, which is a continuation of application No. 16/833,775, filed on Mar. 30, 2020, now Pat. No. 11,075,971.

(60) Provisional application No. 62/829,336, filed on Apr. 4, 2019.

(51) Int. Cl.

| | |
|---|---|
| ***H04L 47/26*** | (2022.01) |
| ***H04L 65/75*** | (2022.01) |
| ***H04L 69/22*** | (2022.01) |
| ***H04N 21/2343*** | (2011.01) |
| ***H04N 21/2365*** | (2011.01) |

(52) U.S. Cl.

CPC .............. *H04L 47/26* (2013.01); *H04L 65/75* (2022.05); *H04L 69/22* (2013.01); *H04N 21/2343* (2013.01); *H04N 21/2365* (2013.01)

(56) References Cited

U.S. PATENT DOCUMENTS

| | | | |
|---|---|---|---|
| 8,184,168 | B2 | 5/2012 | Kindborg et al. |
| 8,341,662 | B1 | 12/2012 | Bassett et al. |
| 8,516,529 | B2 | 8/2013 | Patel et al. |
| 9,438,432 | B2 | 9/2016 | Shepherd et al. |
| 9,571,897 | B2 | 2/2017 | Shepherd et al. |
| 9,723,221 | B2 | 8/2017 | Iijima et al. |
| 9,769,527 | B2 | 9/2017 | Frusina et al. |
| 9,826,138 | B1 | 11/2017 | Mckelvie et al. |
| 9,853,822 | B2 | 12/2017 | Wijnands et al. |
| 9,942,053 | B2 | 4/2018 | Wijnands et al. |
| 10,218,524 | B2 | 2/2019 | Wijnands et al. |
| 10,225,090 | B2 | 3/2019 | Wijnands et al. |
| 10,270,962 | B1 | 4/2019 | Stout |
| 10,284,912 | B2 | 5/2019 | Frusina et al. |
| 10,341,672 | B2 | 7/2019 | Choi et al. |
| 10,536,628 | B2 | 1/2020 | Liang et al. |
| 10,630,889 | B1 | 4/2020 | Stout |
| 10,764,076 | B2 | 9/2020 | Wijnands et al. |
| 10,911,694 | B2 | 2/2021 | Damstra et al. |
| 11,134,185 | B2 | 9/2021 | Van Geel et al. |
| 11,323,780 | B2 | 5/2022 | Wei et al. |
| 11,330,316 | B2 | 5/2022 | Shaw et al. |
| 11,449,460 | B2 | 9/2022 | Huston et al. |
| 11,470,361 | B2 | 10/2022 | Bustamante et al. |
| 11,489,997 | B2 | 11/2022 | Van Geel et al. |
| 11,695,999 | B2 | 7/2023 | Wei et al. |
| 2002/0044201 | A1 | 4/2002 | Alexander et al. |
| 2002/0069076 | A1 | 6/2002 | Faris et al. |
| 2005/0036512 | A1 | 2/2005 | Loukianov |
| 2005/0094562 | A1 | 5/2005 | Roy et al. |
| 2006/0156164 | A1 | 7/2006 | Meyer et al. |
| 2007/0110107 | A1 | 5/2007 | Tighe et al. |
| 2007/0223459 | A1 | 9/2007 | Crowle et al. |
| 2008/0137541 | A1 | 6/2008 | Agarwal et al. |
| 2011/0069179 | A1 | 3/2011 | Bathiche et al. |
| 2012/0182397 | A1 | 7/2012 | Heinzle et al. |
| 2014/0244854 | A1 | 8/2014 | Patel et al. |
| 2014/0354768 | A1 | 12/2014 | Mei et al. |
| 2015/0078377 | A1 | 3/2015 | Wijnands et al. |
| 2015/0078378 | A1 | 3/2015 | Wijnands et al. |
| 2015/0078379 | A1 | 3/2015 | Wijnands et al. |
| 2015/0078380 | A1 | 3/2015 | Wijnands et al. |
| 2015/0131660 | A1 | 5/2015 | Shepherd et al. |
| 2015/0181309 | A1 | 6/2015 | Shepherd et al. |
| 2015/0264258 | A1 | 9/2015 | Bervoets et al. |
| 2015/0358537 | A1 | 12/2015 | Mirza |
| 2017/0099232 | A1 | 4/2017 | Shepherd et al. |
| 2017/0163411 | A1 | 6/2017 | Van Den Berghe |
| 2018/0041696 | A1 | 2/2018 | Balasubramanian et al. |
| 2019/0028774 | A1 | 1/2019 | Chakra et al. |
| 2019/0028775 | A1 | 1/2019 | Chakra et al. |
| 2019/0313160 | A1 | 10/2019 | Stokking et al. |
| 2020/0322693 | A1 | 10/2020 | Wei et al. |

SYSTEMS AND METHODS FOR OPERATING A MEDIA TRANSMISSION NETWORK

CROSS-REFERENCE TO RELATED APPLICATIONS

This application is a continuation of U.S. patent application Ser. No. 18/339,393 filed on Jun. 22, 2023, which is a continuation of U.S. patent application Ser. No. 17/355,228 filed on Jun. 23, 2021 (now U.S. Pat. No. 11,722,541), which is a continuation of U.S. patent application Ser. No. 16/833,775 filed on Mar. 30, 2020 (now U.S. Pat. No. 11,075,971), which claims the benefit U.S. Provisional Application No. 62/829,336 filed on Apr. 4, 2019. The entire contents of the applications are hereby incorporated by reference.

FIELD

The described embodiments relate to operating a media transmission network, and in particular to configuring source devices that generate and transmit media streams.

BACKGROUND

Media transmission networks can route media streams from various source devices to various downstream destination devices. Media streams can contain video, audio, or metadata content. The metadata is often referred to as vertical ancillary data (VANC) or horizontal ancillary data (HANC). In separate elementary essence transmission systems, each of the streams is typically a separate stream, in the sense that the information for one stream is not embedded in another stream. This is in contrast to SDI transmission, in which audio and ancillary data is embedded in non-visible portions of a video signal.

Source devices can have various settings that can be configured to control characteristics of the media streams that they generate. For example, a camera can have white balance, brightness, contrast, and other settings that affect the corresponding video stream. Similarly, a microphone can have equalization or tone settings that affect the corresponding audio stream. When media streams are received at a downstream device, the media streams may be inconsistent in their content. For example, the color balance of video streams may differ so that the same item may be shown in different colors in different video streams. Similarly, audio streams may differ in that the same sound may have different equalization or tone in the different audio streams. Accordingly, it may be desirable to modify one or more media streams so that they are consistent in their content.

SUMMARY

In one aspect, some embodiments provide a system for operating a media transmission network. The system includes at least one destination device and a controller. The at least one destination device can receive a plurality of media streams from a plurality of source devices. The controller is configured to, for each media stream of the plurality of media streams: determine a media property adjustment for the media stream based at least on the media stream; identify a source device from the plurality of source devices associated with generating the media stream; determine at least one device setting for the identified source device to apply the media property adjustment to the media stream; generate a control packet for configuring the identified source device based on the at least one device setting, the control packet including the at least one device setting; and transmit the control packet to the identified source device.

In some embodiments, for each media stream of the plurality of media streams, the identified source device is configured to: receive the control packet; and configure the identified source device based on the at least one device setting to apply the media property adjustment to the media stream.

In some embodiments, determining the media property adjustment includes: determining a media property of the media stream; determining a media property of a second media stream; and determining the media property adjustment based on the media property of the media stream and the media property of the second media stream.

In some embodiments, the media property adjustment adjusts the media property of the media stream to be consistent with the media property of the second media stream.

In some embodiments, determining the media property adjustment is further based on the at least one destination device.

In some embodiments, the media property adjustment includes at least one of: color balance, brightness, contrast, resolution, frame rate, noise reduction, artifact removal, and image enhancement.

In some embodiments, the media property adjustment includes at least one of: volume, sampling rate, equalization, balance, tone, noise reduction, and audio enhancement.

In some embodiments, the plurality of source devices includes at least one intermediate processing device.

In some embodiments, the plurality of source devices includes at least one of: a video source device, an audio source device, and a metadata source device.

In some embodiments, the plurality of media streams includes at least one of: a video stream, an audio stream, and a metadata stream.

In one aspect, some embodiments provide a method for operating a media transmission network. The method involves receiving, at at least one destination device, a plurality of media streams from a plurality of source devices. The method further involves, for each media stream of the plurality of media streams: determining, at a controller, a media property adjustment for the media stream based at least on the media stream; identifying, at the controller, a source device from the plurality of source devices associated with generating the media stream; determining, at the controller, at least one device setting for the identified source device to apply the media property adjustment to the media stream; generating, at the controller, a control packet for configuring the identified source device based on the at least one device setting, the control packet including the at least one device setting; and transmitting, at the controller, the control packet to the identified source device.

In some embodiments, the method further involves, for each media stream of the plurality of media streams: receiving, at the identified source device, the control packet; and configuring the identified source device based on the at least one device setting to apply the media property adjustment to the media stream.

In some embodiments, determining the media property adjustment involves: determining, at the controller, a media property of the media stream; determining, at the controller, a media property of a second media stream; and determining, at the controller, the media property adjustment based on the media property of the media stream and the media property of the second media stream.

In some embodiments, the media property adjustment adjusts the media property of the media stream to be consistent with the media property of the second media stream.

In some embodiments, determining the media property adjustment is further based on the at least one destination device.

In some embodiments, the media property adjustment includes at least one of: color balance, brightness, contrast, resolution, frame rate, noise reduction, artifact removal, and image enhancement.

In some embodiments, the media property adjustment includes at least one of: volume, sampling rate, equalization, balance, tone, noise reduction, and audio enhancement.

In some embodiments, the plurality of source devices includes at least one intermediate processing device.

In some embodiments, the plurality of source devices includes at least one of: a video source device, an audio source device, and a metadata source device.

In some embodiments, the plurality of media streams includes at least one of: a video stream, an audio stream, and a metadata stream.

In one aspect, some embodiments provide a system for operating a media transmission network. The system includes a plurality of source devices, at least one destination device, and a controller. The plurality of source devices can generate and transmit a plurality of media streams. The at least one destination device can receive the plurality of media streams from the plurality of source devices. The controller is configured to, for each media stream of the plurality of media streams: determine a media property adjustment for the media stream based at least on the media stream; identify a source device from the plurality of source devices associated with generating the media stream; determine at least one device setting for the identified source device to apply the media property adjustment to the media stream; generate a control packet for configuring the identified source device based on the at least one device setting, the control packet including the at least one device setting; and transmit the control packet to the identified source device.

BRIEF DESCRIPTION OF THE DRAWINGS

Embodiments of the present invention will now be described in detail with reference to the drawings, in which.

Figure 1:
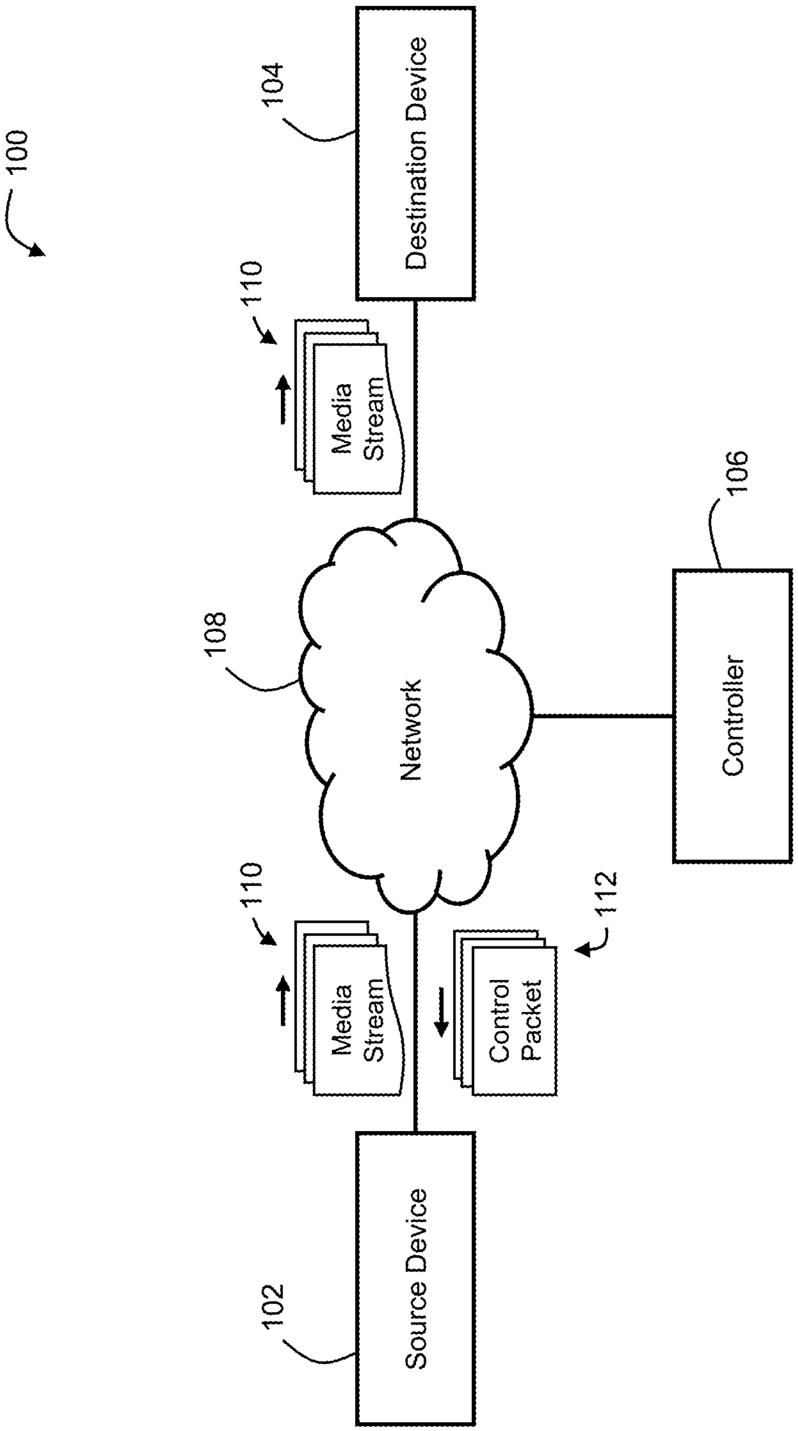
FIG. 1 is a block diagram of a system for operating a media transmission network, in accordance with at least one embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is first made to FIG. 1, which illustrates a system 100 for operating a media transmission network, in accordance with at least one embodiment. System 100 includes source device 102, network 108, destination device 104, and controller 106. Source device 102, destination device 104, and controller 106 are connected via network 108. Various data can be transmitted between source device 102, destination device 104, and/or controller 106, across network 108. It will be appreciated that although only one source device 102 and one destination device 104 are shown, there may be any number of source and destination devices, as will be discussed with in further detail with regard to FIGS. 2 and 3.

Source device 102 can generate media streams 110 and transmit media streams 110 to destination device 104, through network 108. Each stream of media streams 110 can include video, audio, or metadata content. In some embodiments, each stream includes only one type of content. In other embodiments, each stream can include more than one type of content. A media stream that includes video, audio, or metadata may be referred to as a video stream, audio stream, or metadata stream, respectively. In some embodiments, each stream of media streams 110 is packetized. It will be appreciated that although only three media streams 110 are shown, there can be any number of media streams 110.

In some cases, source device 102 generates media content for media streams 110. For example, source device 102 may be a camera, microphone, or other device for generating video, audio, or metadata content. In such cases, source device 102 can generate media streams 110 from the media content generated by source device 102. In other cases, source device 102 can receive media content from one or more upstream devices (not shown). That is, source device 102 can generate media streams 110 using media content received from another device. In some cases, source device 102 may be an intermediate processing device. For example, source device 102 can receive a media stream and process the content of that media stream to generate a processed media stream. Source devices 102 will be discussed in further detail with respect to FIGS. 2 and 3.

Destination device 104 can receive media streams 110 from source device 102, through network 108. In some cases, destination device 104 can present one or more of media streams 110. For example, destination device 104 may include a monitor for displaying one or more video streams, or a speaker for playing one or more audio streams. In some cases, destination device 104 can be a part of a broadcast production system. In some cases, destination device 104 can transmit one or more of media streams 110 to one or more downstream devices (not shown). In some cases, destination device 104 may process one or more streams before presenting or transmitting the streams. In some cases, destination device 104 may capture one or more of media streams 110 to a storage device (not shown).

Controller 106 can analyze the content of one or more of media streams 110 received by destination device 104. For example, for a video stream, controller 106 may analyze the color balance, brightness, contrast, resolution, frame rate, or other properties of the video content. Similarly, for an audio stream, controller 104 may analyze the volume, sampling rate, equalization, balance, tone, or other properties of the audio content. Likewise, for a metadata stream, controller 104 may analyze various properties of the metadata content, such as the format or structure.

Controller 106 can be any suitable processors, controllers, digital signal processors, graphics processing units, application specific integrated circuits (ASICs), and/or field programmable gate arrays (FPGAs) that can provide sufficient processing power depending on the configuration, purposes and requirements of the system 100. In some embodiments, controller 106 can include more than one processor with each processor being configured to perform different dedicated tasks. In some embodiments, controller 106 may be located at destination device 104. In some cases, controller 106 may be integrated as part of destination device 104.

Controller 106 can access the content of one or more of media streams 110 in various ways. In some cases, source device 102 can transmit media streams 110 to controller 106, in addition to destination device 104, through network 108. In some cases, destination device 104, after receiving media streams 110, can transmit the received media streams to controller 106 through network 108. In some cases, source device 102 or destination device 104 may only transmit a portion of media streams 110 necessary for controller 106 to perform its analysis. In some cases, some of the analysis may be performed by destination device 104 and transmitted to controller 106. In some cases, these transmissions may be sent over a different network from network 108. For example, source device 102, controller 106, and/or destination device 104 may be communicatively coupled by one or more other connections (not shown).

Controller 106 can determine media content adjustments based on analyses of media streams 110. That is, controller 106 can determine a media property adjustment for a media stream based at least on the media stream. The media content adjustments may be adjustments or corrections to the media content properties analyzed by controller 106. For example, for a video stream, controller 106 may determine a correction for the color balance, brightness, contrast, resolution, frame rate, or another video property. Similarly, for an audio stream, the media property adjustment may be the volume, sampling rate, equalization, balance, tone, or another audio property. Likewise, for a metadata stream, the correction may be with respect to the format, structure, or other metadata property. The media content adjustment can be an increase or decrease, or any other change or modification to the content of a media stream. In some cases, a media content adjustment may be a filtering property. For example, for a video stream, the media property adjustment may be noise reduction, artifact removal, or image enhancement. Similarly, for an audio stream, the media property adjustment may be noise reduction, artifact removal, or image enhancement.

Controller 106 can determine the media content adjustments in various ways. In some cases, the media content adjustment is determined based on a predetermined reference value. In some cases, the predetermined reference value may be based on a requirement for destination device 104 or a further downstream device (not shown). For example, for a video stream, destination device 104 may require a minimum brightness or contrast. Accordingly, controller 106 can determine that the brightness or contrast of the video content of the stream should be increased, in order to satisfy the requirements of destination device 104. Similarly, for an audio stream, destination device 104 may require a maximum volume level, and controller 106 may determine that volume level of the audio content should be decreased. Likewise, for a metadata stream, destination device may require a specific format, and controller 106 may determine that reformatting the metadata content is required.

Controller 106 can determine one or more device settings for source device 102 that apply the media property adjustments to the respective media streams. For example, if source device 102 is a camera and the media property adjustment is a brightness adjustment, the device setting may be an aperture setting. Adjusting the aperture setting of the camera may adjust the brightness in the video stream content produced by the camera. Similarly, if source device 102 is a microphone and the media property adjustment is a volume adjustment, the device setting may be a gain setting. Modifying the gain setting of the microphone may adjust the volume of the audio stream content generated by the microphone. Likewise, if source device 102 generates metadata, the media property adjustment may be a format setting that modifies the structure of the metadata.

Controller 106 can generate control packets 112 for controlling source device 102. Control packets 112 can include one or more of the device settings determined by controller 106. Control packets 112, when received by source device 102, can configure source device 102 based on the device settings, and thus apply the media property adjustments to the respective media streams. It will be appreciated that control packets 112 can be any data structure or collection of the various data items, regardless of whether it is assembled or transmitted in any particular structure. Furthermore, it will be appreciated that although only three control packets 112 are shown, there can be any number of control packets 112.

Controller 106 can transmit control packets 112 to source device 102 through network 108. Source device 102 can receive control packets 112 through network 108. In some embodiments, control packets 112 may be transmitted through a separate network (not shown) from media streams 110. When control packets 112 are received by source device 102, source device 102 is configured based on the device settings to apply the media property adjustments to the respective media streams. Since media streams 110 can be adjusted as they are generated by source device 102, media streams 110 may be usable at destination device 104 without further processing.

Figure 2:
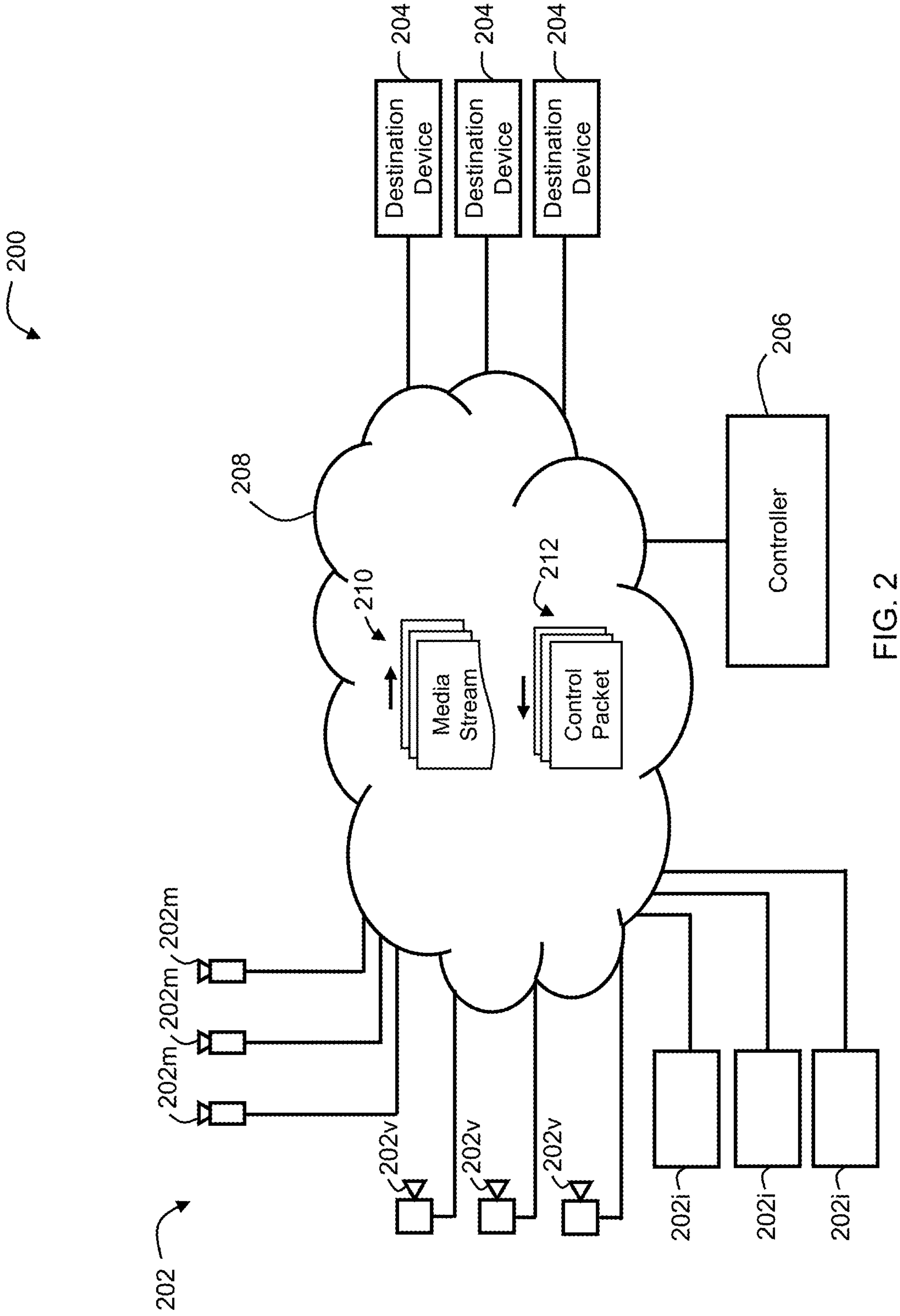
FIG. 2 is a block diagram of a system for operating a media transmission network, in accordance with at least one embodiment.

Reference is now made to FIG. 2, shown therein is a system 200 for operating a media transmission network, in accordance with at least one embodiment. Similar to system 100 of FIG. 1, system 200 includes controller 206 and network 208. However, in contrast to system 100, which includes only one source device 102 and one destination device 104, system 200 includes a plurality of source devices 202 and a plurality of destination devices 204.

Source devices 202 can perform similar functions as source device 102. Source devices 202 include video source devices **202*v*, audio source devices 202*m*, and other source devices 202*i*. In some cases, the video source devices 202*v* may be cameras for generating video content, and the audio source devices 202*m* may be microphones for generating audio content. In some cases, video source devices and/or audio source devices 220*m* may also generate metadata content. Each of the plurality of source devices 202 can generate media streams 210 and transmit media streams 210 to any of destination devices 204, through network 208. Although only three video source devices 202*v*, audio source devices 202*m*, and other source devices 202*i* are shown, it will be appreciated there can be any number of any type of source devices 202** are possible.

Destination devices 204 can perform similar functions as destination device 104. Each of the plurality of destination devices 204 can receive media streams 210 from any of source devices 202, through network 208. Destination devices 204 can process, output or further transmit the received media streams. Although only three destination deices 204 are shown, it will be appreciated that there can be any number of destination devices 204.

In some cases, system 200 can be implemented as part of a broadcast production system. For example, video source devices **202*v* may generate various video streams from different viewpoints at a sporting venue during a game. In some cases, video source devices 202*v* may also generate various audio streams. Audio source devices 220*m* may also be placed throughout the venue to generate other audio streams. The various media streams 210 can be transmitted to destination devices 204, through network 208**, where one or more of the streams can be outputted and reviewed by an operator. The operator can select one or more media streams to process or transmit to downstream devices. In some cases, review and selection may be automatic and may not require an operator.

Controller 206 can perform similar functions as controller 106. For example, controller 206 can determine one or more media content adjustments for media streams 210, determine one or more device settings for source devices 202, and generate and transmit control packets 212, in a similar fashion as controller 106. In some embodiments, controller 206 may be located at one or more of destination devices 204. In some cases, controller 206 may be integrated as part of one or more of destination devices 204.

However, in contrast to controller 106, controller 206 can identify the source device that is associated with generating the media stream for a respective media content adjustment. That is, controller 206 can identify the particular source device responsible for generating a particular media stream. Controller 206 can determine one or more media property adjustments for that media stream and one or more device settings for the identified source device. Controller 206 can then transmit a control packet 212 to the identified device to apply the device setting to the identified device and apply the media property adjustment to the media stream.

In some cases, controller 206 can determine a media property adjustment for one media stream in relation to another media stream. For example, controller 206 can determine a media property of a first media stream, determine a media property of a second media stream, and determine the media property adjustment based on the media properties of the first and second media streams. In some cases, the media property adjustment may adjust the media property of the first media stream to be consistent with the media property of the second stream.

For example, two or more of media streams 210 may be inconsistent with regard to their respective content. For video streams, the colour balance of the streams may differ so that the same item is shown in different colours. Audio streams may differ in that the same sound may have different equalization or tone. Metadata streams may differ in that the same metadata is formatted in different structures. Controller 206 can determine media property adjustments to correct one or more streams so that they are consistent with regard to the other respective streams. Since media streams 210 can be adjusted as they are generated by source devices 202, media streams 210 may be usable at destination devices 204 without further processing.

Figure 3:
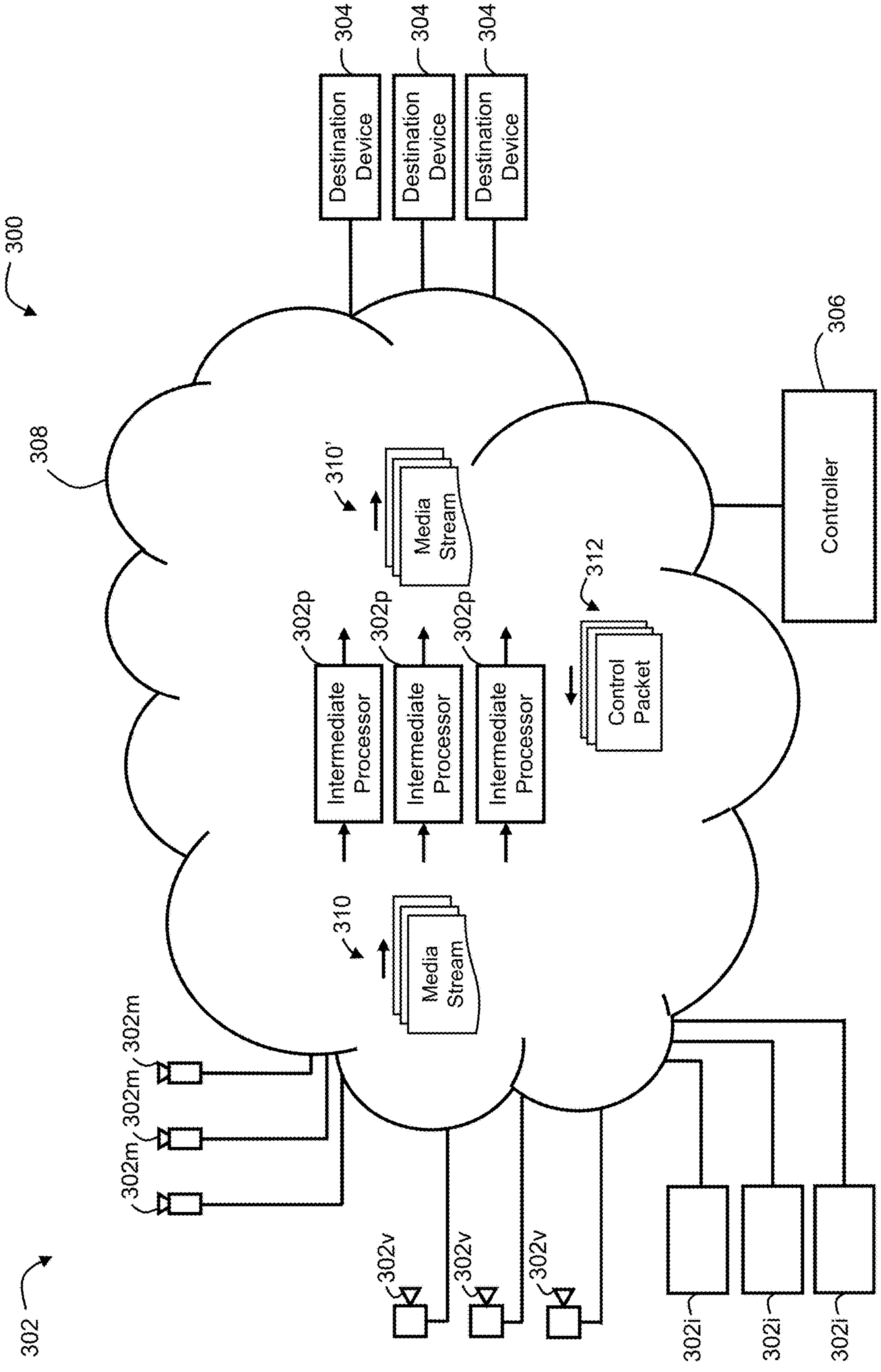
FIG. 3 is a block diagram of a system for operating a media transmission network, in accordance with at least one embodiment.

Reference is now made to FIG. 3, shown therein is a system 300 for operating a media transmission network, in accordance with at least one embodiment. Similar to system 200 of FIG. 2, system 300 includes source devices 302, destination devices 304, controller 306 and network 308. However, in contrast to system 200, source devices 302 further include a plurality of intermediate processing devices 302*p*.

Similar to system 200, each of source devices 302 can generate and transmit media streams 310 to any of destination devices 304 across network 308. However, in contrast to system 200, some of source devices 302 can also transmit media streams 310 to other of source devices 302. For example, audio source devices 302*m*, video source devices 302*v*, and other source devices 302*i* can transmit media streams 310 to intermediate processor devices 302*p*.

Intermediate processing devices 302*p* are located within network 308. Each intermediate processing device 302*p* can receive media streams 310 from any of audio source devices 302*m*, video source devices 302*v*, or other source devices 302*i*. Intermediate processing devices 302*p* can process media streams 310 to produce processed media streams 310'. Intermediate processing devices 302*p* can transmit any of processed media streams 310' to any of destination devices 304. It will be appreciated that although only three intermediate processors 302*p* are shown, there can be any number of intermediate processors 302*p*. It will be appreciated that although only three media streams 310 and three processed media streams 310' are shown, there can be any number of media streams 310 and/or media streams 310'.

Intermediate processors 302*p* can process media streams 310 in various ways to produce processed media streams 310'. For example, for a video stream, intermediate processors 302*p* may crop the video content to reduce the resolution of the video content. Similarly, for an audio stream, intermediate processors 302*p* may increase or decrease the volume of the audio content. Likewise, for a metadata stream, intermediate processors 302*p* may reformat or restructure the metadata content.

Similar to destination devices 204, destination devices 304 can receive media streams 310 from source devices 302, through network 308. However, destination devices 304 can also receive processed media streams 310' from intermediate processing devices 302*p*. Destination devices 304 can output, process, or further transmit media streams 310 or processed media streams 310'.

Controller 306 can perform similar functions as controller 206. For example, controller 306 can, for each stream of media streams 310 or processed media streamed 310', identify a source device associated with generating that stream, determine media property adjustments for that media stream and device settings for the identified device to apply the media property adjustments. Controller 306 can further transmit control packets 312 to the identified devices to apply the device settings and apply the media property adjustments to the respective media streams. In some embodiments, controller 306 may be located at one or more of destination devices 304. In some cases, controller 306 may be integrated as part of one or more of destination devices 304.

Figure 4:
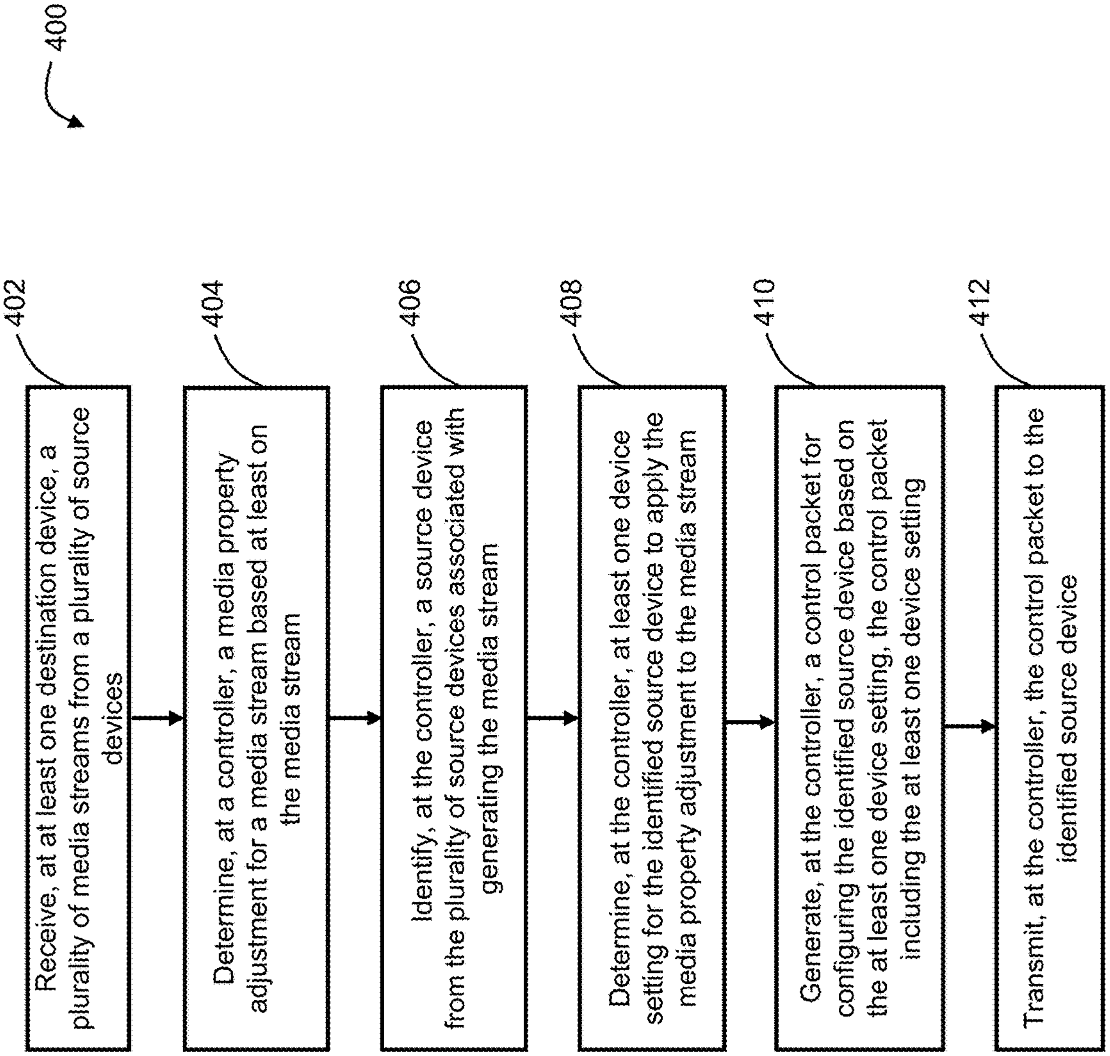
FIG. 4 is a flowchart of a method for operating a media transmission network, in accordance with at least one embodiment.

Reference is now made to FIG. 4, shown therein is a method 400 for operating a media transmission network, in accordance with at least one embodiment. For example, method 400 may be implemented using systems 100, 200, 300 of FIGS. 1, 2, and 3. Method 400 begins with receiving, at at least one destination device, a plurality of media streams from a plurality of source devices at 402. For example, media streams 110, 210, 310 from source devices 102, 202, 302 may be received by destination devices 104, 204, 304.

At 404, a media property adjustment for a media stream is determined based at least on the media stream at a controller. For example, controller 106, 206, 306 may determine a media property adjustment for one of media streams 110, 210, 310.

At 406, a source device from the plurality of source devices associated with generating the media stream is identified at the controller. For example, controller 106, 206, 306 may identify one of source devices 102, 202, 302 associated with generating the particular stream of media streams 110, 210, 310.

At 408, at least one device setting for the identified source device is determined at the controller. The at least one device setting can apply the media property adjustment to the media stream. For example, controller 106, 206, 306 can determine a device setting for the identified device of source devices 102, 202, 302.

At 410, a control packet for configuring the identified source device based on the at least one device setting is generated at the controller. The control packet includes the at least one device setting. For example, controller 106, 206, 306 may generate a control packets 112, 212, 312.

At 412, the control packet is transmitted, at the controller, to the identified source device. For example, controller 106, 206, 306 may transmit control packets 112, 212, 312 to the identified device of source devices 102, 202, 302.

The present invention has been described here by way of example only. Various modification and variations may be made to these exemplary embodiments without departing from the spirit and scope of the invention, which is limited only by the appended claims.

We claim:

1. A system for operating a media transmission network comprising:

at least one destination device for receiving at least two media streams from at least one source device, including a first media stream and a second media stream; and a controller configured to:

determine a first media property of the first media stream;

determine a second media property of the second media stream;

determine a media property adjustment based on the first media property of the first media stream and the second media property of the second media stream, wherein the media property adjustment adjusts the first media property to be consistent with the second media property;

determine at least one device setting for the first source device to apply the media property adjustment to the first media stream;

generate a control packet for configuring the first source device based on the at least one device setting, the control packet including the at least one device setting; and transmit the control packet to the first source device.

2. The system of claim 1, wherein the controller is further configured to:

identify a first source device associated with generating the first media stream; and transmit the control packet to the identified first source device.

3. The system of claim 2, wherein for the first media stream, the first identified source device is configured to:

receive the control packet; and configure the identified first source device based on the at least one device setting to apply the media property adjustment to subsequent media streams transmitted by the identified first source device.

4. The system of claim 1, wherein the first media stream and the second media stream are received from a same source device.

5. The system of claim 1, wherein the second media stream is received from a second source device different from the first source device.

6. The system of claim 1, wherein the media property adjustment includes a parameter selected from the group consisting of color balance, brightness, contrast, resolution, frame rate, noise reduction, artifact removal, and image enhancement.

7. The system of claim 1, wherein the media property adjustment includes a parameter selected from the group consisting of volume, sampling rate, equalization, balance, tone, noise reduction, and audio enhancement.

8. The system of claim 1, wherein the at least one source device includes at least one of: a video source device, an audio source device, or a metadata source device.

9. The system of claim 1, wherein the at least two media streams includes a media stream selected from the group consisting of a video stream, an audio stream, and a metadata stream.

10. The system of claim 1, wherein determining the media property adjustment is based on a corresponding predetermined reference value associated with the at least one destination device.

11. A method for operating a media transmission network comprising:

receiving, by at least one destination device, at least two media streams from at least one source device, including a first media stream and a second media stream; and determining, at a controller, a first media property of the first media stream;

determining, at the controller, a second media property of the second media stream;

determining, at the controller, a media property adjustment based on the first media property of the first media stream and the second media property of the second media stream, wherein the media property adjustment adjusts the first media property to be consistent with the second media property;

determining, at the controller, at least one device setting for the first source device to apply the media property adjustment to the first media stream;

generating, at the controller, a control packet for configuring the first source device based on the at least one device setting, the control packet including the at least one device setting; and transmitting, at the controller, the control packet to the first source device.

12. The method of claim 11, further comprising:

identifying, at the controller, a first source device associated with generating the first media stream; and transmitting, at the controller, the control packet to the identified first source device.

13. The method of claim 12, further comprising:

for the first media stream:

receiving, at the first identified source device, the control packet; and configuring the identified first source device based on the at least one device setting to apply the media property adjustment to subsequent media streams transmitted by the identified first source device.

14. The method of claim 11, wherein the first media stream and the second media stream are received from a same source device.

15. The method of claim 11, wherein the second media stream is received from a second source device different from the first source device.

16. The method of claim 11, wherein the media property adjustment includes a parameter selected from the group consisting of color balance, brightness, contrast, resolution, frame rate, noise reduction, artifact removal, and image enhancement.

17. The method of claim 11, wherein the media property adjustment includes a parameter selected from the group consisting of volume, sampling rate, equalization, balance, tone, noise reduction, and audio enhancement.

18. The method of claim 11, wherein the at least one source device includes at least one of: video source device, an audio source device, or a metadata source device.

19. The method of claim 11, wherein the at least two media streams includes a media stream selected from the group consisting of a video stream, an audio stream, and a metadata stream.

20. The method of claim 11, wherein determining the media property adjustment is based on a corresponding predetermined reference value associated with the at least one destination device.

* * * * *